United States Patent
Hong et al.

(10) Patent No.: US 11,941,396 B2
(45) Date of Patent: Mar. 26, 2024

(54) CURRENT VARIATION SLOPE CONTROL METHOD FOR MULTI-CORE PROCESSOR, CONTROL DEVICE AND MEDIUM

(71) Applicant: Shanghai Biren Technology Co., Ltd, Shanghai (CN)

(72) Inventors: Zhou Hong, Shanghai (CN); Yunya Fei, Shanghai (CN); Hao Shu, Shanghai (CN); ChengKun Sun, Shanghai (CN)

(73) Assignee: Shanghai Biren Technology Co., Ltd, Shanghai (CN)

( * ) Notice: Subject to any disclaimer, the term of this patent is extended or adjusted under 35 U.S.C. 154(b) by 0 days.

(21) Appl. No.: 17/958,445

(22) Filed: Oct. 3, 2022

(65) Prior Publication Data
US 2023/0131810 A1   Apr. 27, 2023

(30) Foreign Application Priority Data
Oct. 21, 2021   (CN) .......................... 202111223781.7

(51) Int. Cl.
*G06F 9/30* (2018.01)
*G06F 9/50* (2006.01)

(52) U.S. Cl.
CPC ............ *G06F 9/3001* (2013.01); *G06F 9/505* (2013.01)

(58) Field of Classification Search
None
See application file for complete search history.

(56) References Cited

U.S. PATENT DOCUMENTS

| | | | |
|---|---|---|---|
| 6,636,976 B1 * | 10/2003 | Grochowski | G06F 1/28 713/320 |
| 7,035,785 B2 * | 4/2006 | Grochowski | G06F 1/26 713/322 |
| 7,236,920 B2 * | 6/2007 | Grochowski | G06F 1/26 716/136 |
| 7,536,575 B2 * | 5/2009 | Adachi | G06F 1/206 713/322 |
| 7,742,910 B2 * | 6/2010 | Grochowski | G06F 1/26 713/322 |
| 8,595,743 B2 * | 11/2013 | Gounares | G06F 9/5083 718/104 |
| 9,098,260 B2 * | 8/2015 | Martin | G06F 1/28 |
| 9,250,910 B2 * | 2/2016 | Hurd | G06F 1/325 |
| 9,430,242 B2 * | 8/2016 | Nelson | G06F 9/3836 |

(Continued)

*Primary Examiner* — Steven G Snyder
(74) *Attorney, Agent, or Firm* — JCIP GLOBAL INC.

(57) ABSTRACT

The present disclosure provides a DIDT control method. The method includes, at each of a plurality of DIDT control modules: obtaining a local operation load of a local ALU in each clock cycle; obtaining a global operation load of a plurality of ALUs in each cycle period; determining an operation load index of the local ALU based on local historical load information and a local historical load weight set of the local ALU and global historical load information and a global historical load weight set of the multiple ALUs, the global historical load information includes a first number of the global operation loads, the local historical load information includes a second number of the local operation loads; and adjusting an operation load of the local ALU based on the operation load index of the local ALU and a predetermined load threshold to control a DIDT of the local ALU.

10 Claims, 5 Drawing Sheets

(56) References Cited

U.S. PATENT DOCUMENTS

| | | | | |
|---|---|---|---|---|
| 9,560,124 | B2* | 1/2017 | Eisenbud | H04L 67/1025 |
| 9,998,529 | B2* | 6/2018 | Eisenbud | H04L 67/1025 |
| 11,054,882 | B2* | 7/2021 | Becker | G06F 1/3203 |
| 11,204,766 | B2* | 12/2021 | Kim | G06F 1/26 |
| 2006/0230256 | A1* | 10/2006 | Chrysos | G06F 9/3858 |
| | | | | 712/E9.063 |
| 2009/0300329 | A1* | 12/2009 | Naffziger | G06F 1/3203 |
| | | | | 712/205 |
| 2013/0047166 | A1* | 2/2013 | Penzes | H03L 7/0802 |
| | | | | 718/105 |
| 2013/0117759 | A1* | 5/2013 | Gounares | G06F 9/50 |
| | | | | 718/104 |
| 2013/0262831 | A1* | 10/2013 | Nelson | G06F 9/3887 |
| | | | | 712/215 |
| 2014/0026142 | A1* | 1/2014 | Gounares | G06F 9/5083 |
| | | | | 718/104 |
| 2019/0384603 | A1* | 12/2019 | Kim | G06F 1/3243 |
| 2022/0091652 | A1* | 3/2022 | Augustine | H03K 19/017509 |
| 2022/0231949 | A1* | 7/2022 | Ramaswamy | H04L 47/125 |
| 2022/0231950 | A1* | 7/2022 | Ramaswamy | H04L 45/123 |

\* cited by examiner

CURRENT VARIATION SLOPE CONTROL METHOD FOR MULTI-CORE PROCESSOR, CONTROL DEVICE AND MEDIUM

CROSS-REFERENCE TO RELATED APPLICATION

This application claims the priority benefit of China application serial no. 202111223781.7, filed on Oct. 21, 2021. The entirety of the above-mentioned patent application is hereby incorporated by reference herein and made a part of this specification.

BACKGROUND

Technical Field

The present disclosure generally relates to the field of multi-core processors, and more particularly, to a current variation slope (DIDT) control method, a control device and a computer-readable storage medium for a multi-core processor.

Description of Related Art

In a multi-core processor, the computing tasks of the entire processor are allocated to computing units in multiple cores to complete the computing tasks cooperatively. When performing computing tasks with a large amount of computation in artificial intelligence (AI), machine learning (ML) or other fields, the computing units in each core need to bear a considerable number of operation loads. When the operation load increases, the operating current in the computing unit increases, and the rapid increasing speed of current might cause the hardware components of the computing unit to generate heat, result in temperature rise or even to be burned down, which will bring risks to the safety performance of the hardware components of the computing unit.

Currently, for the general matrix multiplication (GEMM) arithmetic logic unit (ALU) in the AI accelerator, DIDT may be reduced in a systolic mode. The systolic mode may start and stop the operation logic of the entire GEMM in a time-sharing manner, thereby reducing the DIDT when services are started and stopped.

However, the systolic mode is only able to control the DIDT of the single-core ALU, and is not able to coordinate the DIDT between the multi-core ALUs of the entire chip, and the systolic mode is a fixed DIDT adjustment method. When the time-sharing logic of each GEMM ALU is divided by hardware, the DIDT at the start and stop of the multi-core ALU of the entire chip is fixed, and the DIDT can no longer be dynamically adjusted according to the differences of subsequent applications and hardware boards.

SUMMARY

In order to solve the safety problem brought by the current variation in a multi-core processor, the present disclosure provides a DIDT control method for the multi-core processor, which configures a DIDT control module for each ALU in the multi-core processor, so as to adjust the operation load of the ALU according to the local load information of the ALU and the global load information of all ALUs and corresponding weights and thresholds, thereby controlling the DIDT of the ALU.

According to an aspect of the present disclosure, a DIDT control method for a multi-core processor is provided. The multi-core processor includes multiple ALUs and each ALU is associated with a DIDT control module. The method includes obtaining a local operation load of the local ALU in each clock cycle at each DIDT control module; obtaining the global operation load of the multiple ALUs in each cycle period; determining the operation load index of the local ALU based on the local historical load information and the local historical load weight set of the local ALU and the global historical load information and the global historical load weight set of the multiple ALUs, and the global historical load information includes a first number of global operation loads, the local historical load information includes a second number of local operation loads; and adjusting the operation load of the local ALU based on the operation load index of the local ALU and a predetermined load threshold to control the DIDT of the local ALU.

In some embodiments, the cycle period includes a plurality of clock cycles.

In some embodiments, the global historical load weight set includes a first number of global historical load weight values. Each global historical load weight value corresponds to a global operation load in the global historical load information, and the global historical load weight value sequentially decreases with the acquisition time of the global operation load. The local historical load weight set includes a second number of local historical load weight values. Each local historical load weight value corresponds to a local operation load in the local historical load information, and the local historical load weight value decreases sequentially with the acquisition time of the local operation load.

In some embodiments, the step of determining the operation load index of the local ALU includes: using the local historical load weight set and the global historical load weight set to respectively perform weighted summing on the local historical load information of the local ALU and the global historical load information of the multiple ALUs to determine the operation load index of the local ALU.

In some embodiments, the local historical load weight set includes a first local historical load weight set and a second local historical load weight set. The global historical load weight set includes a first global historical load weight set and a second global historical load weight set. The step of determining the operation load index of the local ALU includes: measuring at least two current values of the local ALU in at least two consecutive clock cycles; determining whether the DIDT of the local ALU is greater than zero based on the at least two current values; in response to determining that the DIDT of the local ALU is greater than zero, determining the operation load index of the local ALU based on the local historical load information and the first local historical load weight set of the local ALU and the global historical load information and the first global historical load weight set of the multiple ALUs; and in response to determining that the DIDT of the local ALU is less than zero, determining the operation load index of the local ALU based on the local historical load information and the second local historical load weight set of the local ALU and the global historical load information and the second global historical load weight set of the multiple ALUs.

In some embodiments, the predetermined load threshold includes a first load threshold and a second load threshold. The step of adjusting the operation load of the local ALU based on the operation load index of the local ALU and the predetermined load threshold to control the DIDT of the local ALU includes: in response to determining that the DIDT of the local ALU is greater than zero, adjusting the operation load of the local ALU based on the operation load index of the local ALU and the first load threshold to control the DIDT of the local ALU; and in response to determining that the DIDT of the local ALU is less than zero, adjusting the operation load of the local ALU based on the operation load index of the local ALU and the second load threshold to control the DIDT of the local ALU.

In some embodiments, the step of adjusting the operation load of the local ALU based on the operation load index of the local ALU and the predetermined load threshold to control the DIDT of the local ALU includes: determining whether the operation load index of the local ALU is greater than or equal to the predetermined load threshold; and in response to determining that the operation load index of the local ALU is greater than or equal to the predetermined load threshold, reducing the loading speed of the operation load of the local ALU to reduce the DIDT of the local ALU.

In some embodiments, the step of adjusting the operation load of the local ALU based on the operation load index of the local ALU and the predetermined load threshold to control the DIDT of the local ALU further includes: in response to determining that the operation load index of the local ALU is less than the predetermined load threshold, scheduling additional operation load for the local ALU.

According to another aspect of the present disclosure, there is provided a control device including: at least one processor; and at least one memory coupled to the at least one processor and storing instructions to be executed by the at least one processor. When being executed by the at least one processor, the instructions enable the control device to perform the steps of the method as described above.

According to another aspect of the present disclosure, there is provided a computer-readable storage medium having a computer program code stored therein, and the computer program code executes the method as described above when being executed.

By adopting the scheme of the present disclosure, the DIDT of each ALU is controlled through adjusting the operation load of each ALU in real time based on global information, which avoids the influence of excessive current changes on the safety performance of hardware components, thereby ensuring the stability operation of business. In addition, each ALU shares its own operation load information in real time, so that each ALU of the entire multi-core processor may filter and adjust its own operation load in real time.

BRIEF DESCRIPTION OF THE DRAWINGS

The present disclosure will be more comprehensible and other purposes, details, features and advantages of the present disclosure will become more apparent by referring to the following description of specific embodiments of the present disclosure given in the accompanying drawings.

DESCRIPTION OF THE EMBODIMENTS

Figure 1:
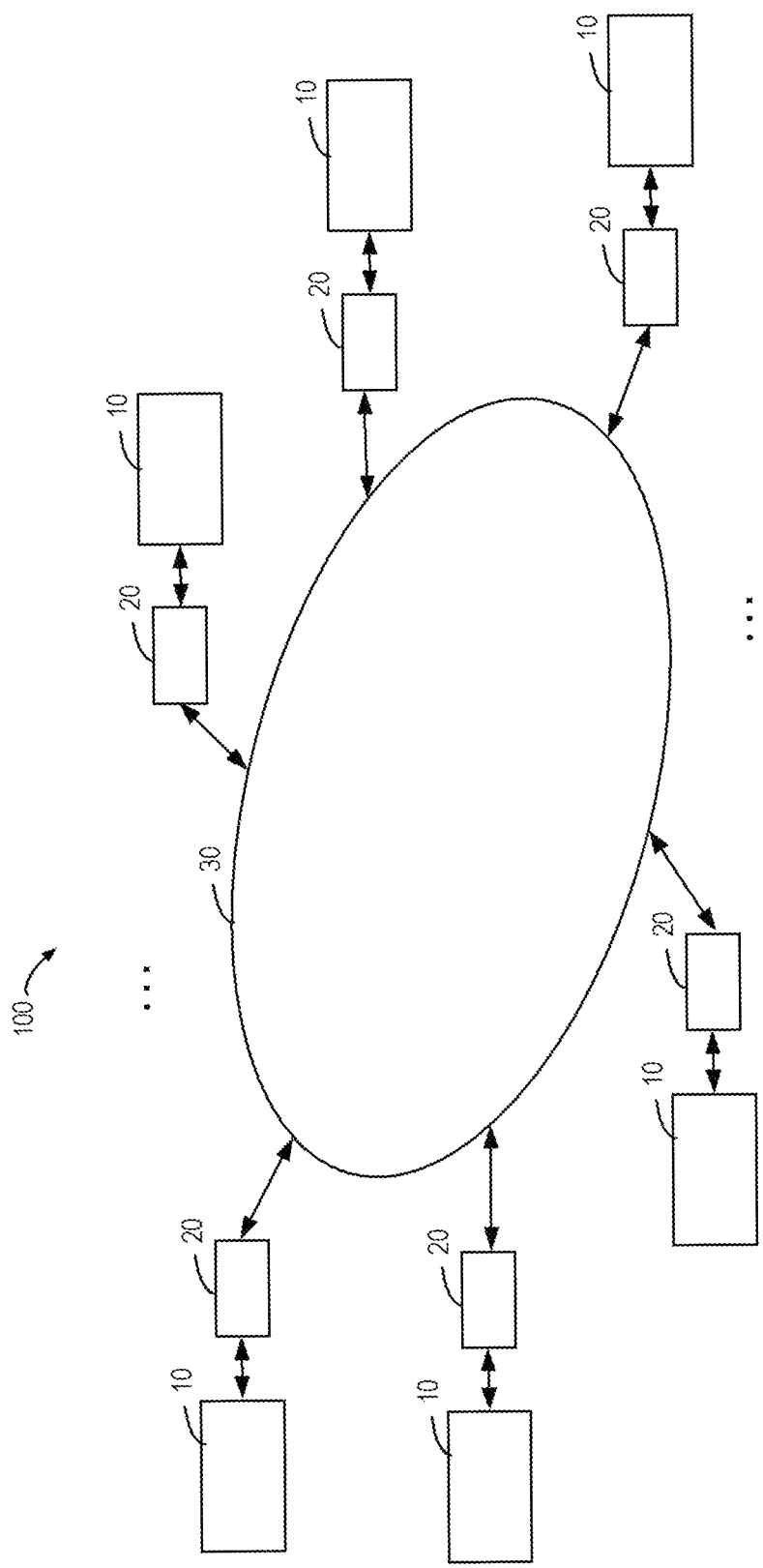
FIG. 1 shows a schematic diagram of a multi-core processor according to an embodiment of the present disclosure.

Preferred embodiments of the present disclosure will be described in more detail below with reference to the accompanying drawings. While preferred embodiments of the present disclosure are shown in the drawings, it should be understood that the present disclosure may be embodied in various forms and should not be limited by the embodiments set forth herein. Rather, these embodiments are provided so that this disclosure will be thorough and complete, and will fully convey the scope of the disclosure to those person skilled in the art.

The term "including" and its variations as used herein means open-ended inclusion, i.e., "including but not limited to". The term "or" means "and/or" unless specifically stated otherwise. The term "based on" means "based at least in part on". The terms "one embodiment" and "some embodiments" mean "at least one exemplary embodiment." The term "another embodiment" means "at least one another embodiment." The terms "first", "second", etc. may refer to different or the same subject.

FIG. 1 shows a schematic diagram of a multi-core processor 100 according to an embodiment of the present disclosure. The multi-core processor 100 may be implemented as a single chip or multiple interconnected chips. As shown in FIG. 1, the multi-core processor 100 includes multiple ALUs 10, and the multiple ALUs 10 cooperatively complete the computing tasks of the multi-core processor 100. The ALU 10 may be, for example, a GEMM ALU. In the field of deep learning and the like, a large amount of computation is required to simulate the state transitions of various elements, so the use of multi-core processors with multiple GEMM ALUs has become increasingly common. When the multi-core processor 100 completes its computing tasks, it is necessary to distribute the operation load to each ALU 10 as evenly as possible, so as to prevent some ALUs 10 from having an excessively large number of loads and affecting safety performance of hardware, while other ALUs 10 having too few number of load and the computing power cannot be sufficiently utilized. It should be noted that, in the disclosure, although the ALU is used as an example to describe the computing unit of the multi-core processor 100, those skilled in the art can understand that, depending on the manufacturer or the standard, the ALU may also have various other names, such as stream processor (SP), shader, etc., and these other various names may be considered equivalent replacements for the ALU described herein, without departing from the spirit and scope of the present disclosure described herein.

As shown in FIG. 1, in the multi-core processor 100 described in the present disclosure, an associated DIDT control module 20 is configured for each ALU 10, and the DIDT control module 20 is used for real-time and global control of the operation load of the local ALU 10, thus controlling the DIDT of the local ALU 10. The specific structure and operation of the DIDT control module 20 will be described in more detail below in conjunction with FIG. 2 and FIG. 3.

A plurality of DIDT control modules 20 in the multi-core processor 100 may be connected through a link 30 to exchange their operation load information. The link 30 has, for example, a link structure of a daisy-chain topology.

Figure 2:
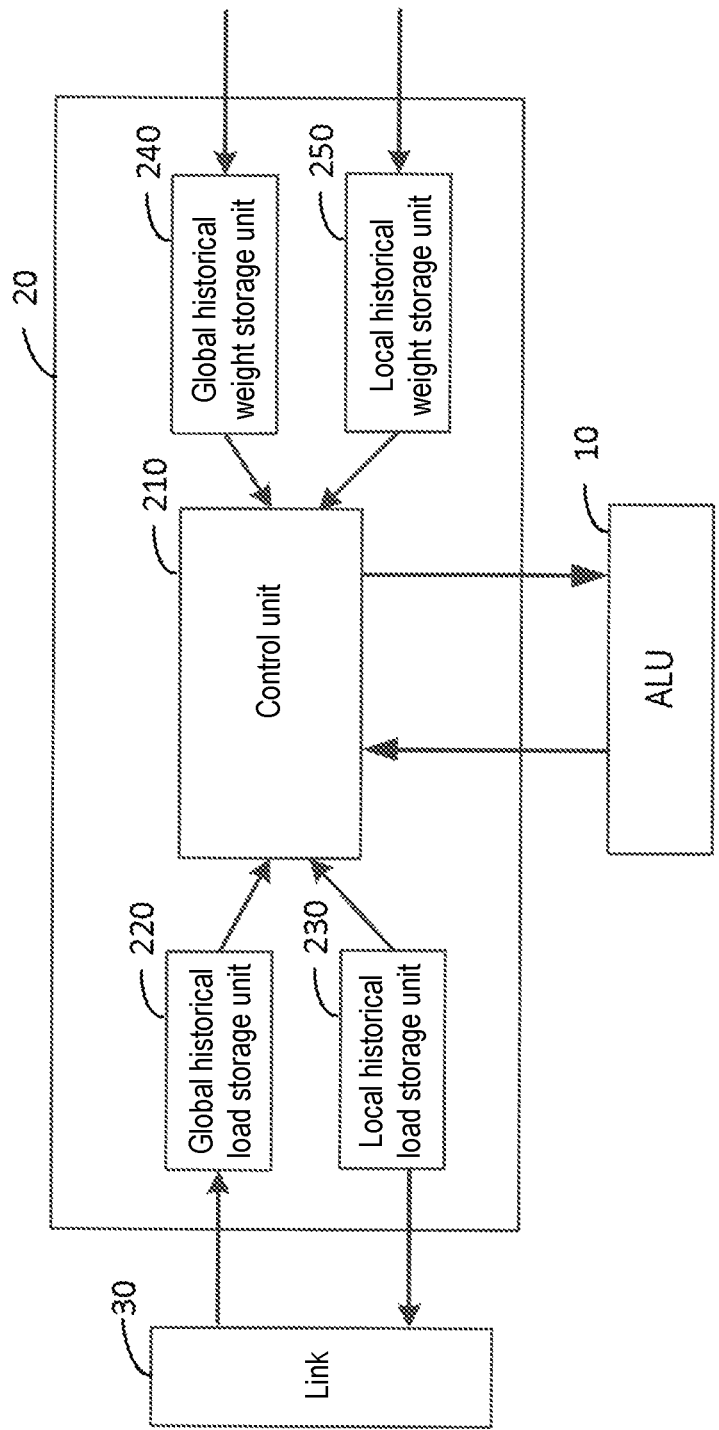
FIG. 2 shows a schematic structural diagram of a DIDT control module according to an embodiment of the present disclosure.

FIG. 2 shows a schematic structural diagram of a DIDT control module 20 according to an embodiment of the present disclosure.

As shown in FIG. 2, the DIDT control module 20 may include a control unit 210, a global historical load storage unit 220, a local historical load storage unit 230, a global historical weight storage unit 240, and a local historical weight storage unit 250.

The global historical load storage unit 220 is configured to store global historical load information, and the global historical load information includes a plurality of global operation loads obtained from the multiple ALUs 10 of the multi-core processor 100. The local historical load storage unit 230 is configured to store local historical load information, and the local historical load information includes multiple local operation loads obtained from the ALU 10 associated with the DIDT control module 20 (hereinafter, the ALU 10 associated with the DIDT control module 20 is also referred to as the local ALU 10). In the embodiment of the present disclosure, for the local historical load information, the local operation load may be acquired once every clock cycle C and stored in the local historical load storage unit 230 as one of the local historical load information. For the global historical load information, the operation load of the corresponding ALU 10 in the cycle period T may be obtained from each ALU 10 (for example, through the link 30) once per cycle period T. The operation loads of various ALUs 10 in the cycle period T are summed to obtain a global operation load, and the global operation load is stored in the global historical load storage unit 220 as one of the global historical load information. Here, the clock cycle C refers to the clock cycle of the ALU 10, which is determined by the hardware component of the ALU 10. For example, the cycle period T may be set by the user of the multi-core processor 100 according to the level of the link 30, the number of ALUs 10, the distance, etc., and the cycle period T may, for example, include a few tens of clock cycles C. Each global operation load is the sum of the operation loads of the multiple ALUs 10 (including the local ALU 10) of the multi-core processor 100 in the cycle period T.

In some embodiments, the number of global operation loads stored in the global historical load storage unit 220 may be different from the number of local operation loads stored in the local historical load storage unit 230. The number of global operation loads stored in the global historical load storage unit 220 is referred to as a first number N1, and the number of local operation loads stored in the local historical load storage unit 230 is referred to as a second number N2. The first number N1 may be greater than, equal to or less than the second number N2. In some embodiments, the second number N2 may be greater than the first number N1. For example, N1 may be several or a dozen, and N2 may be dozens.

The following Tables 1 and 2 respectively show examples of the global historical load information in the global historical load storage unit 220 and the local historical load information in the local historical load storage unit 230 according to some embodiments of the present disclosure.

TABLE 1

Global historical load information

| Cycle period T | Global operation load |
|---|---|
| 1 | $WL_1(1)$ |
| 2 | $WL_1(2)$ |
| ... | ... |
| N1 | $WL_1(N1)$ |

TABLE 2

Local historical load information

| Clock cycle C | Local operation load |
|---|---|
| 1 | $WL_2(1)$ |
| 2 | $WL_2(2)$ |
| ... | ... |
| N2 | $WL_2(N2)$ |

In the Tables, the global historical load storage unit 220 stores N1 global operation loads $WL_1(1)$ and $WL_1(2)$ to $WL_1(N1)$ in the order of the cycle period T for obtaining the global operation load, and $WL_1(i)$ represents the global operation load obtained in the i-th cycle period T ($1 \leq i \leq N1$). The local historical load storage unit 230 stores N2 local operation loads $WL_2(1)$ and $WL_2(2)$ to $WL_2(N2)$ in the order of the obtained clock cycles C, and $WL_2(j)$ represents the local operation load obtained at the j-th clock cycle C ($1 \leq j \leq N2$). Here, it is assumed that the data with earlier acquisition time comes first, and the data with later acquisition time comes after. When more data is acquired, the first acquired data is deleted from the global historical load storage unit 220 and the local historical load storage unit 230.

The global historical weight storage unit 240 is configured to store a global historical load weight set. The global historical load weight set includes a first number of global historical load weight values, and each global historical load weight value corresponds to one global operation load in the global historical load information. The local historical weight storage unit 250 is configured to store a local historical load weight set. The local historical load weight set includes a second number of local historical load weight values, and each local historical load weight value corresponds to a local operation load in the local historical load information.

The following Tables 3 and 4 respectively show examples of the global historical load weight set in the global historical weight storage unit 240 and the local historical load weight set in the local historical weight storage unit 250 according to some embodiments of the present disclosure.

TABLE 3

Global historical load weight set

| Cycle period T | Global historical load weight value |
|---|---|
| 1 | $W_1(1)$ |
| 2 | $W_1(2)$ |
| ... | ... |
| N1 | $W_1(N1)$ |

TABLE 4

Local historical load weight set

| Clock cycle C | Local historical load weight value |
|---|---|
| 1 | $W_2(1)$ |
| 2 | $W_2(2)$ |
| ... | ... |
| N2 | $W_2(N2)$ |

In the Tables, the global historical weight set W1 includes N1 global historical load weight values $w_1(1)$ and $w_1(2)$ to $w_1(N1)$ corresponding to N1 global operation loads $WL_1(1)$ and $WL_1(2)$ to $WL_1(N1)$ respectively, that is, $W_1=\{w_1(1), w_1(2), \ldots, w_1(N1)\}$. The local historical weight set W2 includes N2 local historical load weight values $w_2(1)$ and $w_2(2)$ to $w_2(N2)$ corresponding to N2 local operation loads $WL_2(1)$ and $WL_2(2)$ to $WL_2(N2)$, that is, $W_2=\{w_2(1), w_2(2), \ldots, w_2(N2)\}$.

The global historical weight set W1 and the local historical weight set W2 may be configured by the user of the multi-core processor 100, for example, and each weight value may have a bit width of 4-8 bits and may be a signed integer. In some embodiments, the longer the load has a smaller weight value, therefore, the N1 global historical load weight values $w_1(1)$ and $w_1(2)$ to $w_1(N1)$ shown in Table 3 may be sequentially incremented, and the N2 local historical load weight values $w_2(1)$ and $w_2(2)$ to $w_2(N2)$ shown in Table 4 are also sequentially incremented.

Figure 3:
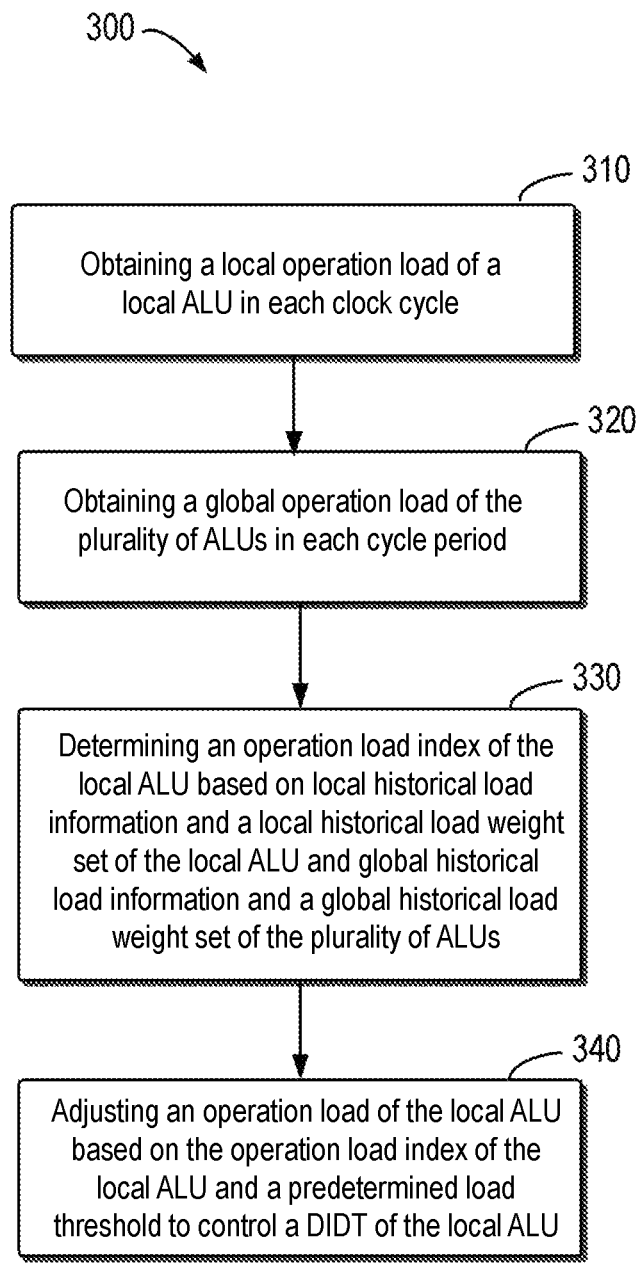
FIG. 3 shows a flowchart of a DIDT control method of a multi-core processor according to some embodiments of the present disclosure.

FIG. 3 shows a flowchart of a DIDT control method 300 of a multi-core processor 100 according to some embodiments of the present disclosure. The DIDT control method 300 is performed by the DIDT control module 20 associated with each ALU 10. The DIDT control method 300 will be described below in conjunction with the DIDT control module 20.

As shown in FIG. 3, in step 310, the DIDT control module 20 (e.g., the local historical load storage unit 230) obtains the local operation load of the local ALU 10 in each clock cycle C.

In step 320, the DIDT control module 20 (e.g., the global historical load storage unit 220) obtains the global operation load of the multiple ALUs 10 (including the local ALU 10) included in the multi-core processor 100 in each cycle period T.

The operation load of one ALU 10 in one cycle period T may be obtained by summing the operation load of the ALU 10 in each clock cycle C in the cycle period T. Moreover, in each cycle period T, each ALU 10 transmits its own operation load in the cycle period T to the other ALUs 10 through the link 30.

For the local ALU 10, in each cycle period T, the DIDT control module 20 may obtain the operation load of each of other ALUs 10 in the cycle period T from other ALUs 10 through the link 30, and sum up these operation loads and the operation load of the local ALU 10 during the cycle period T to obtain the global operation load of the multi-core processor 100 in the cycle period T.

At step 330, the DIDT control module 20 (e.g., the control unit 210) may determine the operation load index of the local ALU 10 based on the local historical load information of the local ALU 10 stored in the local historical load storage unit 230 (as shown in Table 2) and the local historical load weight set W2 stored in the local historical weight storage unit 250 (as shown in Table 4), as well as the global historical load information of the multiple ALUs 10 stored in the global historical load storage unit 220 (as shown in Table 1) and the global historical load weight set W1 stored in the global historical weight storage unit 240 (shown in Table 3). Here, the operation load index is used to indicate the magnitude of change in the current relative load level of the local ALU 10.

In some embodiments, the DIDT control module 20 may use the local historical load weight set W2 and the global historical load weight set W1 to perform weighted summing on the local historical load information of the local ALU 10 and the global historical load information of the multiple ALUs 10, respectively, thereby determining the operation load index of the local ALU 10.

For example, the operation load index $WL_A$ of the local ALU 10 may be calculated by the following equation (1):

$$WL_A = w_2(1)*WL_2(1) + w_2(2)*WL_2(2) + \ldots + w_2(N2)*WL_2(N2) + w_1(1)*WL_1(1) + w_1(2)*WL_1(2) + \ldots + w_1(N1)*WL_1(N1) \quad (1)$$

At step 340, the DIDT control module 20 (e.g., the control unit 210) may adjust the operation load of the local ALU 10 based on the operation load index $WL_A$ of the local ALU 10 and a predetermined load threshold Th to control the DIDT of the local ALU 10.

Specifically, in some embodiments, the DIDT control module 20 may determine whether the operation load index $WL_A$ of the local ALU 10 is greater than or equal to the predetermined load threshold Th.

If it is determined that the operation load index $WL_A$ of the local ALU 10 is greater than or equal to the predetermined load threshold Th, the DIDT control module 20 may reduce the loading speed of the operation load of the local ALU 10 to reduce the DIDT of the local ALU 10. That is to say, when the operation load index $WL_A$ of the local ALU 10 is too large, the loading speed of the operation load of the local ALU 10 may be reduced to decrease the operation speed of the local ALU 10. In this way, the operation speed of the local ALU 10 is reduced, so that the generated current does not increase too fast, that is, the DIDT of the local ALU 10 is reduced, thereby protecting the safety of the hardware component of the local ALU 10 itself.

On the other hand, in some embodiments, if it is determined that the operation load index $WL_A$ of the local ALU 10 is less than the predetermined load threshold Th, the DIDT control module 20 may schedule additional operation load for the local ALU 10. That is to say, when the operation load index $WL_A$ of the local ALU 10 is too small, it means that the operation load of the local ALU 10 is lower than the normal level at this time, so additional operation load may be scheduled for the local ALU 10 to make full use of its operation resources.

In some embodiments, considering that hardware components have different requirements for the rising current slope and the falling current slope, the global historical load weight set W1 may be configured to include a first global historical load weight set W11 and a second global historical load weight set W12. The local historical load weight set W2 includes a first local historical load weight set W21 and a second local historical load weight set W22.

The first global historical load weight set W11 and the first local historical load weight set W21 may be used for the current rising phase of the local ALU 10 (i.e., DIDT is greater than 0), and the second global historical load weight set W12 and the second local historical load weight set W22 are used for the current falling phase of the local ALU 10 (i.e., DIDT is less than 0).

Figure 4:
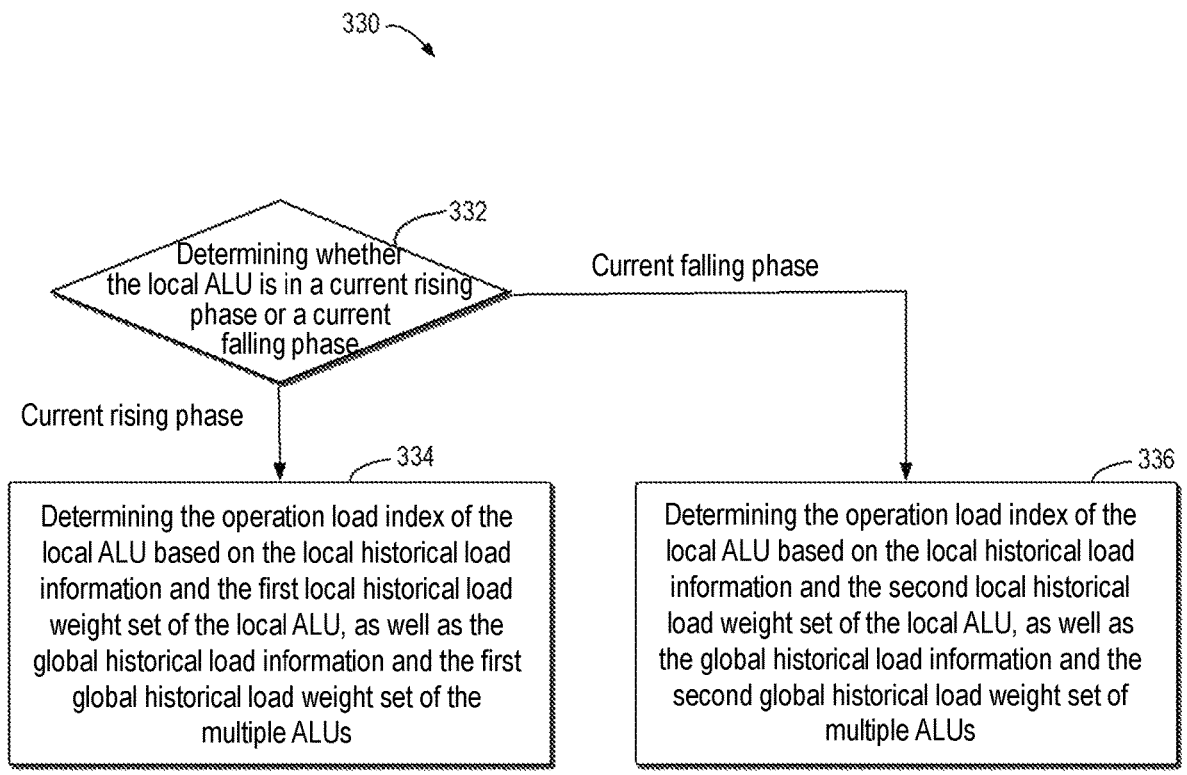
FIG. 4 shows a flow chart of steps for determining an operation load index of a local ALU according to some embodiments of the present disclosure.

FIG. 4 shows a flowchart of step 330 for determining the operational load index of the local ALU 10 according to some embodiments of the present disclosure.

As shown in FIG. 4, at sub-step 332, the DIDT control module 20 may determine whether the local ALU 10 is in a current rising phase or a current falling phase.

In some embodiments, the DIDT control module 20 may measure at least two current values of the local ALU 10 in at least two consecutive clock cycles, and determine whether the local ALU 10 is in a current rising phase or current falling phase based on the at least two current values.

For example, the DIDT control module 20 may measure two current values I1 and I2 in two consecutive clock cycles C1 and C2, and may calculate the DIDT of the local ALU 10 through the following equation (2):

$$\text{DIDT} = (I2 - I1)/tc \tag{2}$$

In the equation, tc is the duration of one clock cycle C.

If the calculated DIDT of the local ALU 10 is greater than zero, it means that the local ALU 10 is in the current rising phase, and if the calculated DIDT of the local ALU 10 is less than zero, it means that the local ALU 10 is in the current falling phase.

In some cases, it is inconvenient or inaccurate to directly measure the current value of the local ALU 10. In view of this situation, in other embodiments, the change of the operation load of the local ALU 10 may be measured to determine whether the local ALU 10 is in the current rising phase or the current falling phase. Specifically, the DIDT control module 20 may measure at least two operation loads (i.e., local operation loads) of the local ALU 10 in at least two consecutive clock cycles, and determine whether the local ALU 10 is in a current rising phase or a current falling phase based on the at least two operation loads.

For example, the DIDT control module 20 may measure two operation loads $WL_1$ and WL2 in two consecutive clock cycles C1 and C2, and calculate the operation load change rate of the local ALU 10 through the following equation (3):

$$(WL2 - WL1)/tc \tag{3}$$

In the equation, tc is the duration of one clock cycle C.

If the calculated change rate of the operation load of the local ALU 10 is greater than zero, that is, the operation load increases with the clock cycle, it may be determined that the local ALU 10 is in the current rising phase, and if the calculated change rate of operation load of the local ALU 10 is less than zero, that is, the clock cycle of the operation load decreases, it may be determined that the local ALU 10 is in the current falling phase.

If it is determined in sub-step 332 that the local ALU 10 is in the current rising phase, then in sub-step 334, the DIDT control module 20 may determine the operation load index of the local ALU 10 based on the local historical load information and the first local historical load weight set W21 of the local ALU 10 (as shown in Table 2), as well as the global historical load information and the first global historical load weight set W11 of the multiple ALUs 10 of the multi-core processor 100 (as shown in Table 1), as shown in the above equation (1).

On the other hand, if it is determined in sub-step 332 that the local ALU 10 is in the current falling phase, then in sub-step 336, the DIDT control module 20 may determine the operation load index of the local ALU 10 based on the local historical load information (as shown in Table 2) and the second local historical load weight set W22 of the local ALU 10, as well as the global historical load information and the second global historical load weight set W12 of multiple ALUs 10 of the multi-core processor 100 (as shown in Table 1), as shown in the above equation (1).

Correspondingly, different predetermined load thresholds may be set for the current rising phase and the current falling phase. Specifically, the predetermined load threshold may be configured to include a first load threshold Th1 and a second load threshold Th2.

In such case, if it is determined in sub-step 332 that the local ALU 10 is in the current rising phase, then in step 340, the DIDT control module 20 may adjust the operation load of the local ALU 10 based on the operation load index of the local ALU 10 (e.g., the operation load index of the local ALU 10 determined based on the local historical load information and the first local historical load weight set W21 of the local ALU 10 as well as the global historical load information and the first global historical load weight set W11 of the multiple ALUs 10 of the multi-core processor 100) and the first load threshold Th1 to control the DIDT of the local ALU 10.

On the other hand, if it is determined in sub-step 332 that the local ALU 10 is in the current falling phase, then in step 340, the DIDT control module 20 may adjust the operation load of the local ALU 10 based on the operation load index of the local ALU 10 (e.g., the above-mentioned operation load index of the local ALU 10 determined based on the local historical load information and the second local historical load weight set W22 of the local ALU 10 as well as the global historical load information and the second global historical load weight set W12 of the multiple ALUs 10 of the multi-core processor 100) and the second load threshold Th2 to control the DIDT of the local ALU 10.

Figure 5:
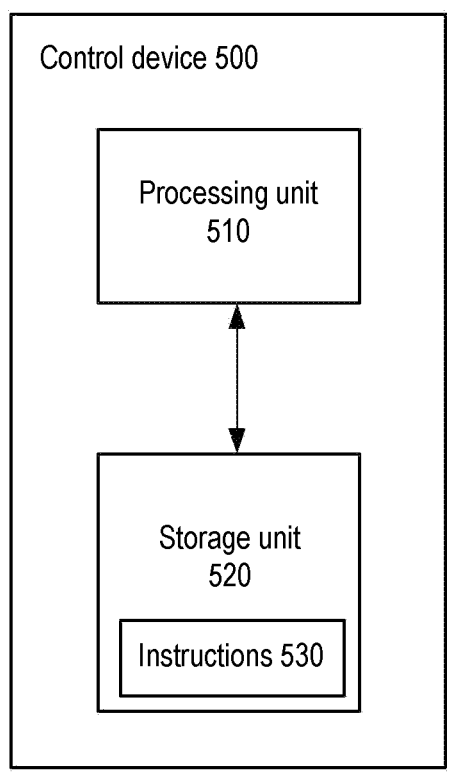
FIG. 5 shows a schematic structural diagram of a control device according to some embodiments of the present disclosure.

FIG. 5 shows a schematic structural diagram of a control device 500 according to some embodiments of the present disclosure. The control device 500 may be the DIDT control module 20 as described above.

As shown in FIG. 5, the control device 500 may include one or more processing units 510. The processing unit 510 controls the operation and function of the control device 500. For example, in some embodiments, the processing unit 510 may perform various operations by virtue of instructions 530 stored in one or more storage units 520 coupled thereto. The storage unit 520 may be of any suitable type suitable for use in the local technical environment, and may be implemented using any suitable data storage technology, including but not limited to semiconductor-based storage devices, magnetic storage devices and systems, optical storage devices and systems. In addition, the storage unit 520 may further be used to implement any one or more of the global historical load storage unit 220, the local historical load storage unit 230, the global historical weight storage unit 240, and the local historical weight storage unit 250 described above in conjunction with FIG. 2. Although only one processing unit 510 and one storage unit 520 are shown in FIG. 5, there may be more physically different processing units 510 and storage units 520 in the control device 500.

The processing unit 510 may be of any suitable type suitable for the local technical environment, and may include, but is not limited to, a microprocessor, a digital signal processor (DSP), a field programmable gate array (FPGA), and the like.

When the control device 500 is used to perform the scheme described in the present disclosure, the processing unit 510 may be configured (e.g., by instructions 530 in the storage unit 520) to implement the method or step described above with reference to FIG. 3 and/or FIG. 4. All the features described above with reference to FIG. 2 to FIG. 4 are applicable to the control device 500 and will not be repeated here.

Using the scheme described in this present disclosure, each ALU may transmit its own operation load to other ALUs in the multi-core processor in real time, so that each ALU may comprehensively determine its own load index according to the global operation load and local operation load, so as to adjust its own operation load to control its DIDT. In addition, each weight value in the global historical weight set and the local historical weight set and predetermined load threshold may be configured by users of the multi-core processor according to actual hardware differences and changes in application requirements, thus making control of DIDT more dynamic and flexible.

Those skilled in the art can understand that the method steps described here are not limited to the order exemplarily shown in the drawings, but can be performed in any other implementable order.

In one or more of the exemplary designs, the functions described herein may be implemented in hardware, software, firmware, or any combination thereof. For example, if implemented in software, the functions may be stored on or transmitted over as one or more instructions or code on a computer-readable medium.

The various components of the interconnected device disclosed herein may be implemented using discrete hardware components or may be implemented integrally on one hardware component, for example, may be implemented by using general purpose processors, digital signal processors (DSPs), application specific integrated circuits (ASICs), field programmable gate arrays (FPGAs) or other programmable logic devices, discrete gate or transistor logic, discrete hardware components or any combination used for performing the functions described in the disclosure or to execute the various exemplary logical blocks, modules, and circuits described in connection with this disclosure.

Those of ordinary skill in the art should also understand that various exemplary logical blocks, modules, circuits, and algorithm steps described in connection with the embodiments of the present disclosure may be implemented as electronic hardware, computer software, or a combination of both.

The above description of the present disclosure is intended to enable any person of ordinary skill in the art to make or use the present disclosure. Various modifications to this disclosure will be readily apparent to those skilled in the art, and the generic principles defined herein may be applied to other modifications without departing from the spirit and scope of this disclosure. Thus, the present disclosure is not intended to be limited to the examples and designs described herein but is to be accorded with the broadest scope consistent with the principles and novelty disclosed herein.

What is claimed is:

1. A current variation slope (DIDT) control method for a multi-core processor, wherein the multi-core processor comprises a plurality of arithmetic logic units (ALUs) and each of the ALUs is associated with a DIDT control module, and the method comprises, at each of the DIDT control modules:
   obtaining a local operation load of a local ALU in each clock cycle;
   obtaining a global operation load of the plurality of ALUs in each cycle period;
   determining an operation load index of the local ALU based on local historical load information and a local historical load weight set of the local ALU and global historical load information and a global historical load weight set of the plurality of ALUs, wherein the global historical load information comprises a first number of the global operation loads, the local historical load information comprises a second number of the local operation loads; and
   adjusting an operation load of the local ALU based on the operation load index of the local ALU and a predetermined load threshold to control a DIDT of the local ALU.

2. The DIDT control method according to claim 1, wherein the cycle period comprises a plurality of clock cycles.

3. The DIDT control method according to claim 1, wherein the global historical load weight set comprises a first number of global historical load weight values, each of the global historical load weight values corresponds to one of the global operation loads in the global historical load information, and the global historical load weight value sequentially decreases with an acquisition time of the global operation load; and
   the local historical load weight set comprises a second number of local historical load weight values, each of the local historical load weight values corresponds to one of the local operation loads in the local historical load information, and the local historical load weight value decreases sequentially with an acquisition time of the local operation load.

4. The DIDT control method according to claim 3, wherein the step of determining the operation load index of the local ALU comprises:
   using the local historical load weight set and the global historical load weight set to respectively perform weighted summing on the local historical load information of the local ALU and the global historical load information of the plurality of ALUs to determine the operation load index of the local ALU.

5. The DIDT control method according to claim 1, wherein the local historical load weight set comprises a first local historical load weight set and a second local historical load weight set, the global historical load weight set comprises a first global historical load weight set and a second global historical load weight set, and the step of determining the operation load index of the local ALU comprises:
   determining whether the local ALU is in a current rising phase or a current falling phase;
   in response to determining that the local ALU is in the current rising phase, determining the operation load index of the local ALU based on the local historical load information and the first local historical load weight set of the local ALU, and the global historical load information and the first global historical load weight set of the plurality of ALUs; and
   in response to determining that the local ALU is in the current falling phase, determining the operation load index of the local ALU based on the local historical load information and the second local historical load weight set of the local ALU, and the global historical load information and the second global historical load weight set of the plurality of ALUs.

6. The DIDT control method according to claim 5, wherein the predetermined load threshold comprises a first load threshold and a second load threshold, and the step of adjusting the operation load of the local ALU based on the operation load index of the local ALU and the predetermined load threshold to control the DIDT of the local ALU comprises:

in response to determining that the local ALU is in the current rising phase, adjusting the operation load of the local ALU based on the operation load index of the local ALU and the first load threshold to control the DIDT of the local ALU; and in response to determining that the local ALU is in the current falling phase, adjusting the operation load of the local ALU based on the operation load index of the local ALU and the second load threshold to control the DIDT of the local ALU.

7. The DIDT control method according to claim 1, wherein the step of adjusting the operation load of the local ALU based on the operation load index of the local ALU and the predetermined load threshold to control the DIDT of the local ALU comprises:

determining whether the operation load index of the local ALU is greater than or equal to the predetermined load threshold; and in response to determining that the operation load index of the local ALU is greater than or equal to the predetermined load threshold, reducing a loading speed of the operation load of the local ALU to reduce the DIDT of the local ALU.

8. The DIDT control method according to claim 7, wherein the step of adjusting the operation load of the local ALU based on the operation load index of the local ALU and the predetermined load threshold to control the DIDT of the local ALU further comprises:

in response to determining that the operation load index of the local ALU is less than the predetermined load threshold, scheduling an additional operation load for the local ALU.

9. A control device, comprising:
at least one processor; and
at least one memory coupled to the at least one processor and storing instructions to be executed by the at least one processor, wherein when being executed by the at least one processor, the instructions enable the control device to perform the steps of the method as claimed in claim 1.

10. A non-transitory computer-readable storage medium having a computer program code stored therein, wherein the computer program code executes the method as claimed in claim 1.

* * * * *